(12) United States Patent
Levit et al.

(10) Patent No.: US 9,913,504 B2
(45) Date of Patent: Mar. 13, 2018

(54) FLAME RESISTANT THERMAL LINER, COMPOSITE FABRIC, AND GARMENT

(71) Applicants: Natalia V Levit, Glen Allen, VA (US); Richard Hall Young, Richmond, VA (US)

(72) Inventors: Natalia V Levit, Glen Allen, VA (US); Richard Hall Young, Richmond, VA (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 413 days.

(21) Appl. No.: 14/876,165

(22) Filed: Oct. 6, 2015

(65) Prior Publication Data

US 2016/0113340 A1  Apr. 28, 2016

Related U.S. Application Data

(60) Provisional application No. 62/067,028, filed on Oct. 22, 2014.

(51) Int. Cl.

| | |
|---|---|
| *B32B 5/26* | (2006.01) |
| *A41D 31/00* | (2006.01) |
| *B32B 5/02* | (2006.01) |
| *B32B 5/00* | (2006.01) |
| *B32B 5/08* | (2006.01) |
| *B32B 5/10* | (2006.01) |
| *B32B 5/22* | (2006.01) |
| *B32B 5/24* | (2006.01) |
| *B32B 7/00* | (2006.01) |
| *B32B 7/02* | (2006.01) |
| *B32B 27/00* | (2006.01) |
| *B32B 27/06* | (2006.01) |
| *B32B 27/08* | (2006.01) |
| *B32B 27/12* | (2006.01) |
| *B32B 27/28* | (2006.01) |
| *B32B 27/34* | (2006.01) |

(52) U.S. Cl.
CPC .......... *A41D 31/0027* (2013.01); *B32B 5/00* (2013.01); *B32B 5/02* (2013.01); *B32B 5/022* (2013.01); *B32B 5/08* (2013.01); *B32B 5/10* (2013.01); *B32B 5/22* (2013.01); *B32B 5/24* (2013.01); *B32B 5/26* (2013.01); *B32B 7/00* (2013.01); *B32B 7/02* (2013.01); *B32B 27/00* (2013.01); *B32B 27/06* (2013.01); *B32B 27/08* (2013.01); *B32B 27/12* (2013.01); *B32B 27/28* (2013.01); *B32B 27/281* (2013.01); *B32B 27/34* (2013.01); *B32B 2250/00* (2013.01); *B32B 2262/00* (2013.01); *B32B 2262/02* (2013.01); *B32B 2262/14* (2013.01); *B32B 2305/18* (2013.01); *B32B 2307/306* (2013.01); *B32B 2307/3065* (2013.01); *B32B 2307/50* (2013.01); *B32B 2307/72* (2013.01); *B32B 2307/724* (2013.01); *B32B 2307/7244* (2013.01); *B32B 2307/7265* (2013.01); *B32B 2437/00* (2013.01); *B32B 2437/02* (2013.01); *B32B 2571/00* (2013.01)

(58) Field of Classification Search
CPC ....................................................... B32B 5/26
See application file for complete search history.

(56) References Cited

U.S. PATENT DOCUMENTS

| | | | |
|---|---|---|---|
| 4,172,706 A | 10/1979 | Guarnieri | |
| 5,468,537 A | 11/1995 | Brown et al. | |
| 7,284,398 B2 | 10/2007 | Hubner | |
| 7,682,994 B2 * | 3/2010 | Van Emden | A41D 31/02 264/103 |
| 8,347,420 B2 | 1/2013 | Kruszewski et al. | |
| 2005/0067732 A1 | 3/2005 | Kim et al. | |
| 2006/0019566 A1 | 1/2006 | Lloyd et al. | |
| 2006/0067732 A1 | 3/2006 | Igarashi | |
| 2008/0220676 A1 | 9/2008 | Marin et al. | |
| 2009/0249531 A1 | 10/2009 | Kruszewski et al. | |
| 2010/0003877 A1 | 1/2010 | Fan et al. | |

FOREIGN PATENT DOCUMENTS

| | | |
|---|---|---|
| JP | 201127234 | 6/2011 |
| WO | WO03/080905 | 10/2003 |
| WO | WO2013030658 | 3/2013 |

OTHER PUBLICATIONS

Gibson, Application of Nanofiber Technology to Nonwoven Thermal Insulation,Journal of Engineerd Fibers&Fabrics, vol. 2, Issue Feb. 2007.
International Search Report and the Written Opinion, dated Jun. 30, 2016, for International Application No. PCT/US2015/056681, international filing date Oct. 21, 2015.

* cited by examiner

*Primary Examiner* — Andrew Piziali

(57) ABSTRACT

The present invention relates to a flame resistant thermal liner comprising a nonwoven sheet comprising nanofibers of a synthetic polymer having an limiting oxygen index of at least 21, a mean flow pore of 10 micrometers or less, a thickness air permeability of 25 to 6000 cubic feet per min–micrometers (12 to 2880 cubic meters per square meter per min–micrometers), and an average thickness $T_1$; and a thermally stable flame resistant fabric attached to an outer surface of the nonwoven sheet, the fabric having an average thickness $T_2$; a surface of the thermally stable fabric being in contact with a surface of the nonwoven sheet; wherein $T_1$ and $T_2$ are selected such that the ratio of $T_1$ to $T_2$ is less than 0.75. The invention also relates to a flame resistant composite fabric comprising the flame resistant thermal liner and a garment comprising this flame resistant composite fabric.

14 Claims, No Drawings

FLAME RESISTANT THERMAL LINER, COMPOSITE FABRIC, AND GARMENT

BACKGROUND OF THE INVENTION

Field of the Invention

This invention concerns flame resistant thermal liners having high thermal resistance per thickness for use in flame resistant thermal protective apparel. The invention also includes a composite fabric system incorporating such flame resistant thermal liners with such things as outer shell fabrics, moisture barriers, and inner lining fabrics to make flame resistant protective garments, and flame resistant garments comprising same.

Gibson et al. in the article "Application of Nanofiber Technology to Nonwoven Thermal Insulation" (Journal of Engineered Fibers and Fabrics, Vol 2, Issue 2-2007) notes that the thermal properties of nanofibers and their protection against cold environments are relatively unknown, and further discloses that literature searches had revealed no fundamental or applied work using polymer nanofibers for thermal insulation applications. The paper discusses that a real-world feature of insulating materials used in military clothing and sleeping bags is the weight, since soldiers must carry their cold weather clothing and sleeping bags This paper tested the thermal properties of various insulating materials using ASTM C-518 "Standard Test Method for Steady-State Thermal Transmission Properties by Means of the Heat Flow Meter Apparatus" where typical conditions measure the heat flow through a material placed between plates operating at rather mild conditions and temperature differential of 50° C. on the upper plate and 10° C. on the lower plate.

The paper further discloses different fibrous materials may be combined together to enhance the thermal insulation properties of a composite insulation, and discloses a layering technique wherein electrospun nonwovens can be tested in series with thick high-loft polyester batting insulation material. There is no disclosure or teaching of how one might use a nonwoven sheet comprising nanofibers to create a flame resistant thermal liner.

US Patent Application Publication 2010/0003877 to Fan et al. discloses a three tier reflective nanofibrous structure which is a IR reflection material coated on a polymeric nanofibers that are supported by a woven or nonwoven substrate. This invention is again related to cold protective clothing and there is no disclosure or teaching of how one might use a nonwoven sheet comprising nanofibers to create a flame resistant thermal liner.

International Patent Application Publication WO2013/030658 to Lau et al. also discloses thermal insulation structures that can be used in extreme cold climates. There is no disclosure or teaching of how one might use a nonwoven sheet comprising nanofibers to create a flame resistant thermal liner.

U.S. Pat. No. 7,284,398 to Hubner discloses a fabric for manufacturing articles of work clothing for protection against the effects of heat, flames or arcing and the like. The fabric incorporates a ply of woven fabric made from what are called "microfiber" yarns, wherein the microfibers have an individual fiber titer of less than 1.3 dtex. Likewise, U.S. Pat. No. 8,347,420 to Kruszewski et al. discloses a thermal liner subassembly, fabric, and protective garment that includes a nonwoven fabric made from crimped staple fiber that is capable of increasing in thickness in response to high heat or flame. Neither of these publications discloses nor teaches how one might use a nonwoven sheet comprising nanofibers to create a flame resistant thermal liner.

Japanese Patent Application Publication 2012-0216024 discloses a nanofiber fiber structure consisting of para-system aramid polymer. The publication includes a statement that this can be used in a protective garment worn by a firefighter. Other Japanese Patent Application Publications, such as 2011-127234 and 2013-185273 to Tamaru disclose research on the use of nanofibers in protective garments for firemen is progressing. Again, however, there is no teaching in any of these references as to how one might actually use a nonwoven sheet comprising nanofibers to create a useful flame resistant thermal liner.

US Patent Application Publication 2008-0220676 to Marin et al. is directed to a waterproof, breathable garment having the ability to pass moisture vapor. The garment includes a fabric layer and a porous coated nanofiber layer, the nanofiber layer having a coating on the surface of the fibers of a fluorocarbon polymeric moiety and a resin binder or extender. The patent discloses that various generic "protective garments" can be constructed, but again there is no teaching related to creating a useful flame resistant thermal liner.

The thermal liners or barriers used in firefighter's turnout coats have two thermal property needs that are in opposition to each other. In the event of a high thermal exposure such as encountered in an emergency condition, the thermal liner must have high thermal insulation in order to protect the wearer from burns. Turnout coats that provide such high levels of thermal insulation can be bulky. However, the weight of the fabrics used in these coats can potentially fatigue the user and/or the bulk can inhibit their ability to perform effectively. Thus, there is a need to provide adequate fire protection with reduced coat weight and bulk.

Therefore there is a need for further improvements, particularly for thinner flame resistant thermal liners, for improved comfort and/or performance.

SUMMARY OF THE INVENTION

The present invention relates to a flame resistant thermal liner comprising a nonwoven sheet comprising nanofibers of a synthetic polymer having an limiting oxygen index of at least 21, a mean flow pore of 10 micrometers or less, a thickness air permeability of 25 to 6000 cubic feet per min–micrometers (12 to 2880 cubic meters per square meter per min–micrometers), and an average thickness $T_1$; and a thermally stable flame resistant fabric attached to an outer surface of the nonwoven sheet, the fabric having an average thickness $T_2$; a surface of the thermally stable fabric being in contact with a surface of the nonwoven sheet; wherein $T_1$ and $T_2$ are selected such that the ratio of $T_1$ to $T_2$ is less than 0.75. The invention also relates to a flame resistant composite fabric comprising the flame resistant thermal liner and a garment comprising this flame resistant composite fabric.

DETAILED DESCRIPTION

The present invention relates to a flame resistant thermal liner. In regards to a thermal liner or a fabric, the phrase "flame resistant" means the fabric has a char length equal to or less than 4 inches and an afterflame equal to or less than 2 seconds per the vertical flame test of ASTM D6413-99. The thermal liner includes a nonwoven sheet comprising nanofibers made from a synthetic polymer having a limiting oxygen index (LOI) of at least 21. In regards to polymers, nanofibers, fibers, or yarns, the phrase "flame resistant"

means the polymer, nanofiber, fiber, or yarn will not support a flame in air. In preferred embodiments the synthetic polymer and nanofibers have a LOI of 26 and higher.

By "nonwoven" sheet is meant a textile structure produced by bonding and/or interlocking of randomly oriented fibers into a web or mat accomplished by mechanical, chemical, thermal or solvent means and combinations thereof.

By "nonwoven sheet comprising nanofibers" is meant the nonwoven sheet is constructed predominantly of nanofibers. The term "nanofibers" refers to fibers having a number average diameter less than 1000 nm, even less than 800 nm, even between about 50 nm and 500 nm, and even between about 100 and 400 nm. In the case of non-round cross-sectional nanofibers, the term "diameter" as used herein refers to the greatest cross-sectional dimension. Predominantly means that greater than 50% of the fibers in the sheet are nanofibers, however, the nonwoven sheet can have greater than 70%, or greater than 90% nanofibers. In some preferred embodiments essentially all (100%) of the fibers in the nonwoven sheet comprising nanofibers are in fact nanofibers.

The nonwoven sheet comprising nanofibers has a mean flow pore size (or "mean flow pore" (MFP)) of 10 micrometers or less. In some embodiments, the mean flow pore size is 6 or less, in some other embodiments the mean flow pore size is 4 or less.

The mean flow pore size of a nonwoven sheet is a quantity measured using liquid according to ASTM Designation E 1294-89, "Standard Test Method for Pore Size Characteristics of Membrane Filters Using Automated Liquid Porosimeter." Surprisingly, it has been found that this method, which uses liquids, is very useful in characterizing suitable nonwoven sheets comprising nanofibers for use in fire resistant garment applications. It is believed that nonwoven sheets comprising nanofibers are unique in that those that have a mean flow pore size of greater than 10 micrometers do not appear to have the adequate "tightness" to be suitable for use in thermal liners. Further it is believed that nonwoven sheets comprising nanofibers having mean flow pore sizes as low as 1.5 micrometers are useful in thermal liners.

It has also been found that the "thickness air permeability" is a useful parameter for characterizing nonwoven sheets comprising nanofibers that are useful in thermal liners. As used herein, "Thickness air permeability" is the product of the average thickness of a single layer of the nonwoven sheet comprising nanofibers, in micrometers, times the average air permeability of a single layer of the nonwoven sheet comprising nanofibers, in either cubic feet per minute (CFM) or cubic meters per square meter per minute (m3/m2/min). It is believed that nonwoven sheets comprising nanofibers having a minimum thickness air permeability of at least 25 cubic feet per min–micrometers (12 cubic meters per square meter per min–micrometers), and a maximum thickness air permeability of 6000 cubic feet per min–micrometers (2880 cubic meters per square meter per min–micrometers) are useful in thermal liners. In some embodiments, nonwoven sheets comprising nanofibers having a maximum thickness air permeability of 3000 cubic feet per min–micrometers (1440 cubic meters per square meter per min–micrometers) are preferred. In some embodiments, nonwoven sheets comprising nanofibers having a minimum thickness air permeability is 150 cubic feet per min–micrometers (72 cubic meters per square meter per min–micrometers) or greater are preferred. It is believed thickness air permeability gives an indication of layer density and bulkiness that is useful in thermal liners.

The average thickness of a single layer of the nonwoven sheets comprising nanofibers is preferably greater than about 45 micrometers. In some embodiments, the maximum average thickness of a single layer of the nonwoven sheets comprising nanofibers is preferably 150 micrometers or less. This is in contrast with typical high loft insulation, which can be on the order of several centimeters in thickness, or even certain insulative fabrics that are typically around 0.5 millimeters thick (500 micrometers) or greater.

In some embodiments, the nonwoven sheets comprising nanofibers can have a surface pattern creating a textured surface. Texturing can be done by air or water jets during manufacture, as well as mechanical indentation, such as by embossing with a patterned roll. However, preferably any such nonwoven sheets maintain an essentially continuous fiber surface; that is, the sheets are aperture-free; that is, free of any holes having a diameter on the scale of a millimeter or so. In some other embodiments the nonwoven sheets comprising nanofibers can be calendered in the nip between two smooth-surfaced calender rolls to form a sheet having a very smooth and uniform surface. In some embodiments, the nonwoven sheets comprising nanofibers can include a nonwoven that has highly elastic stretch and recovery properties.

Processes for making nonwoven sheets comprising nanofibers include electroblowing processes such as disclosed in in representative publications International Publication Number WO2003/080905; U.S. Pat. No. 4,172,706; and United States Patent Application Pub. 2005/0067732; although any method that creates a suitable nonwoven sheet comprising nanofibers as described herein could be used. The electroblowing method comprises feeding a solution of a polymer in a solvent from mixing chamber through a spinning beam, to a spinning nozzle to which a high voltage is applied, while compressed gas is directed toward the polymer solution in a blowing gas stream as it exits the nozzle. Nanofibers are formed and collected as a web on a grounded collector under vacuum.

The collected nanofibers are advantageously bonded. Bonding may be accomplished by known methods, including but not limited to thermal calendering between heated smooth or embossed nip rolls, ultrasonic bonding, and through gas bonding. Bonding increases the strength and the compression resistance of the nonwoven sheet of nanofibers so that it may withstand the forces associated with being handled. It can also adjust the physical properties of the nonwoven sheet such as thickness, density, and the size and shape of the pores. For instance, thermal calendering can be used to reduce the thickness and increase the density and solidity of the sheet, and reduce the size of the pores. Preferably the bulk density of the nonwoven sheet comprising nanofibers is less than 500 kg/m$^3$, preferably in the range of 120 to 500 kg/m$^3$, and the porosity is at least 60%, preferably 75% to 95%. This in turn decreases the flow rate through the medium at a given applied differential pressure. In someembodiments, the nonwoven sheet comprising nanofibers is calendered between heated smooth nip rolls to the degree necessary to provide the desired thickness, air permeability, and mean flow pore size. The amount of calendering needed is dependent on several factors, such as the type of polymer used to make the nanofibers, production speeds, fiber size, etc.

In some preferred embodiments, a polymer precursor, such as polyamic acid, is spun into sheet of polymer precursor nanofibers that is then exposed to heat to complete the polymerization (e.g., imidized into polyimide nanofibers). This is especially useful when a textured surface is desired on the nonwoven sheet comprising nanofibers. The sheet surface roughness can be controlled by the use of air jets that impart streams of air on the sheet surface during sheet manufacture. The temperature and velocity of air imparted to the sheet surface is controlled as desired during imidization (and/or solvent stripping) and the three-dimensional structure of the surface (typically a collection screen) on which the imidization/stripping occurs. The other useful ways to induce texturing on the web surface can include hydro jets, crimping, embossing, etc.

In some preferred embodiments, when a sheet having a "flat" surface is desired, the sheet of polymer precursor nanofibers can be sent through a horizontal IR oven without web restriction in the cross web direction to imidize the fibers or strip the solvent. The resultant sheet has no surface texturing other than random roughness from the nanofiber laydown. The other way to flatten the surface was to send a web through a set of the calender rolls as previously described. Various roll configurations can be used for the web preparation: steel/cotton; steel/Nylon; steel/composite in a nip and gap calendaring mode to produce variety of structures with a range of air permeability, pore size, and porosity.

The nonwoven sheet comprising nanofibers is made from a synthetic polymer having a limiting oxygen index (LOI) of at least 21, preferably at least 26 or higher. Useful polymers for making the nanofibers include such things as polyimide (including fully aromatic polyimide), aromatic polyamide, polyareneazole, melamine, polyacrylonitrile, oxidized polyacrilonitrile, polyethersulphone, polysilphone, polyvidilenefluoride and mixtures thereof. In some embodiments, polymers containing polyimide, meta-aramid, para-aramid, polybenzazole, and polybenzimidazole are especially preferred. Further, the nonwoven sheet comprising nanofibers can be made with nanofibers comprising a single polymer or a mixture of polymers, or if desired the nonwoven sheet comprising nanofibers can have two different types of polymer nanofibers.

At least one outer surface of the nonwoven sheets comprising nanofibers is in contact with and attached to a surface of a thermally stable flame resistant fabric. By "thermally stable" it is meant that such a fabric dimension changes by no more than 10 percent, more preferably by no more than by 6 percent and most preferably by no more than 3 percent in the machine and cross directions when subjected to a temperature greater than 150 degrees C. for at least 5 minutes (ISO 17493).

The thermally stable flame resistant fabric acts as a stabilizing fabric in that it remains relatively flat and dimensionally stable after heat exposure and there is sufficient surface interaction or friction with the nonwoven sheets comprising nanofibers to minimize any lateral shrinkage of the nonwoven sheets comprising nanofibers during a thermal event. Preferably the thermally stable flame resistant fabric is not made from nanofibers, but is made from staple fibers or yarns of staple fibers or continuous filaments. Preferably these fibers or filaments have a diameter of 5 micrometers or more, most preferably 10 micrometers or more.

Suitable flame resistant fibers for the thermally stable flame resistant fabric include but are not limited to those made from aromatic polyamide, polyareneazole, melamine, polyacrylonitrile, polyimide, polyamide-imide, polyetherimides, polyacrylate, polyetherketone, polysulfone, polyethersulfone, and mixtures thereof. Preferred fibers are made from meta-aramid, para-aramid, polybenzazole, polybenzimidazole and polyimide polymer. If the fabric is woven, preferably yarns made from the flame resistant fibers have a yarn tenacity of at least 3 grams per denier (2.7 grams per dtex). Especially suitable flame resistant fibers useful in nonwoven and woven fabrics include fiber blends of metaand para-aramids. One preferred fiber blend of 93% metaaramid, 5% para-aramid and 2% carbon core nylon antistatic fiber, such as Nomex®IIIA, available from E.I. DuPont de Nemours, Wilmington, Del.

The thermally stable flame resistant fabric may be a woven or nonwoven fabric, or a needlepunched felt of staple fibers, any of which utilizing the flame resistant fibers listed previously. In some embodiments the nonwoven fabric has a weight preferably in the range from 0.2 to 3.0 oz/yd$^2$ (7 to 101 g/m$^2$). A suitable thermally stable fabric is Nomex® E89, a spunlaced nonwoven material produced from a blend of Nomex® and Kevlar® staple fibers available from DuPont. E89 fabric has a nominal thickness of 19 mil (0.48 mm) and a basis weight of 1.5 oz/yd$^2$ (50.5 g/m$^2$).

The average thickness of a single layer of the thermally stable flame resistant fabric is preferably greater than about 60 micrometers. In some embodiments, the maximum average thickness of a single layer of the thermally stable flame resistant fabric is preferably 1.25 millimeters or less.

The thermal liner is comprised of a nonwoven sheet comprising nanofibers and a thermally stable flame resistant fabric attached to an outer surface of that nonwoven sheet. The nonwoven sheet and fabric can be attached by any method; however, in certain embodiments, the layers can be mechanically attached. Some methods of mechanical attachment include, but are not limited to, sewing, stitching, and/or quilting. Suitable quilt patterns include box, zig-zag, straight line diagonal or chevron. One especially useful method is to sew or quilt the two layers together using flame retardant thread, such as Nomex® aramid thread (available from Atlantic Thread and Supply, Baltimore, Md.). This is a preferred embodiment because such sewn or quilted thermal liners, while having more than one layer, can be cut and used in garment applications as a single thermal liner fabric.

From a practical point of view, essentially all of one surface of the nonwoven sheet comprising nanofibers is in contact with all of one surface of the thermally stable flame resistant fabric, especially if both surfaces do not have any patterning or embossing. Obviously, if one or both of the nonwoven sheet comprising nanofibers or the thermally stable flame resistant fabric is textured or patterned, then a preferred embodiment is for a major proportion (>50%) of the surfaces of the nonwoven sheet comprising nanofibers and the thermally stable flame resistant fabric to be in contact, and preferably the contact area between the sheets is greater than 75%, and most preferably greater than 80%.

The average thickness $T_1$ of a layer of the nonwoven sheet comprising nanofibers and the average thickness $T_2$ of a layer of the thermally stable flame resistant fabric attached to an outer surface of the nonwoven sheet are selected such the ratio of average thickness $T_1$ to average thickness $T_2$ is less than 0.75. This necessarily means that average thickness $T_1$ is less than average thickness $T_2$, and ensures that the thermal liner is thinner and less bulky than one made with multiple layers of the thermally stable flame resistant fabric. In some embodiments, the ratio of average thickness $T_1$ to average thickness $T_2$ is less than 0.30. In many embodiments, the ratio of average thickness $T_1$ to average thickness $T_2$ is greater than 0.120.

The average thickness of the thermal liner, formed from the combination of a single nonwoven sheet comprising nanofibers and a single thermally stable flame resistant fabric, is preferably greater than about 100 micrometers. In some embodiments, the maximum average thickness of the thermal liner so formed is preferably no greater than 1.4 millimeters. One preferred thermal average thickness is less than 1 millimeter. In some embodiments the preferred thermal liner average thickness is between 0.4 and 0.75 millimeters.

If desired in some embodiments, the unattached surface of either the nonwoven sheet comprising nanofibers or the thermally stable flame resistant fabric, can have, in addition, a protective facecloth attached thereto, which becomes a part of the thermal liner. Suitable facecloths preferentially are comprised of fibers or filament made from a synthetic polymer having a an limiting oxygen index of at least 21 and can include, for example, very lightweight woven scrims. Any such facecloth construction can be helpful in protecting the integrity of the surfaces of the nonwoven sheet comprising nanofibers and/or the thermally stable flame resistant fabric during handling and incorporation into a composite garment. In many instances, a facecloth suitable for use as an interior lining in a garment is desired.

The thermal liner can be used in a composite fabric system for protective garments. In such garments, the use of the combination of nonwoven sheet comprising nanofibers and the thermally stable flame resistant fabric surprisingly provides overall thermal and radiant insulation performance equal to that of either the use of layers of thermally stable flame resistant fabric alone or the use of batts of staple fibers, but at lower garment weights and bulkiness.

Specifically, composite fabrics using a thermal liner comprising the nonwoven sheet comprising nanofibers and the thermally stable flame resistant fabric have been shown to have increased Thermal Protection Performance (TPP) (direct flame insulation) by at least about 5% while adding much less than 5% by weight to the composite fabric, when compared to control fabrics that have thermal liners consisting of only the thermally stable flame resistant fabric without the nonwoven sheet comprising nanofibers. Perhaps more importantly, composite fabrics using a thermal liner of the nonwoven sheet comprising nanofibers and the thermally stable flame resistant fabric have been shown to have increased Radiant Protection Performance (RPP) (radiant heat insulation) by greater than 5% (in most cases significantly greater than 5%) while adding much less than 5% by weight to the composite fabric, when compared to control fabrics that have thermal liners consisting of only the thermally stable flame resistant fabric without the nonwoven sheet comprising nanofibers.

In addition, composite fabrics containing the thermal liners described herein have surprising thermal performance after washing. Surprisingly, it has been found that after 5 washings, quilted composite fabrics using a thermal liner of the nonwoven sheet comprising nanofibers and the thermally stable flame resistant fabric have significant increases in both the TPP and RPP performance. It has been found that the TPP and RPP performance can increase greater than 3 percent for composite fabric samples washed 5 times versus the TPP and RPP of the same composite fabric prior to washing.

In one embodiment, thermal liner can be used in a flame-resistant garment wherein the composite fabric has essentially only one additional layer, which is an outer shell fabric, for such things as jumpsuits for forest fire fighters or for military personnel. Such suits are typically used over the forest firefighters' clothing and can be used to parachute into an area to fight a forest fire.

In one preferred embodiment the thermal liner can be used in a composite fabric system for protective garments, the composite fabric system having at least three components, each component performing a distinct function. In particular, the thermal liner has use in a flame-resistant garment that is a multilayer garment having a general construction such as disclosed in U.S. Pat. No. 5,468,537. Such garments generally have three layers or three types of fabric constructions, each layer or fabric construction performing a distinct function. There is an outer shell fabric that provides flame protection and serves as a primary defense from flames for the fire fighter. Adjacent the outer shell is a moisture barrier that is typically a liquid barrier but can be selected such that it allows moisture vapor to past through the barrier. Laminates of Gore-Tex® PTFE membrane or Neoprene® membranes on a fibrous nonwoven or woven meta-aramid scrim fabric are moisture barriers typically used in such constructions. Adjacent the moisture barrier is the thermal liner, the third component, as described herein, which as previously stated can be also attached to an internal face cloth. The moisture barrier keeps the thermal liner dry and thermal liner protects the wearer from heat stress from the fire or heat threat being encountered by the wearer.

The outer shell can consist of any flame resistant fabric. In some embodiments, the shell comprises aramid fiber. One suitable aramid is poly(metaphenylene isophthalamide) which is marketed under the tradename of Nomex® by E.I. DuPont de Nemours, Inc. Other fabrics utilize poly(paraphenylene terephthalamide) (marketed under the tradename of Kevlar® by E.I. DuPont de Nemours, Inc.) or a polyarenazole such as polybenzimidazole (PBI). Fabrics containing more than one of the aforementioned fibers may also be utilized (Nomex®/Kevlar® or Kevlar®/PBI, for example).

The moisture barrier is a component that serves as a barrier against liquids but can allow moisture vapor to past through the barrier. In flame retardant garments such as firefighter turnout coats, these barriers keep water away from the firefighter and thereby minimize the weight that the firefighter carries. In addition, the barrier allows water vapor (sweat) to escape, an important function when working in a hot environment. Typically, the moisture barrier component comprises a membrane laminated to a nonwoven or woven fabric. Membrane materials used to laminate to the fabric include polytetrafluoroethylene (PTFE) and polyurethane. Examples of such laminates include Crosstech® PTFE membrane or Neoprene® membranes on a fibrous nonwoven or woven meta-aramid fabric.

The various layers in the composite fabric can be attached together using any suitable method including the methods previously mentioned herein for attaching together the nonwoven sheet comprising nanofibers and thermally stable flame resistant fabric. One especially useful method is to quilt the layers together using flame retardant thread. Obviously, the composite fabric is used in the garment with the outer shell fabric closer to the environment having the potential for fire, with the thermal liner closer the wearer or the garment. In some preferred embodiments, when positioning the thermal barrier in the composite fabric, the side of the thermal liner having the nonwoven sheet comprising nanofibers is positioned nearer the liquid barrier, while the thermally stable flame resistant fabric is positioned nearer the wearer. Also, because of the great value the nonwoven sheet comprising nanofibers provides the thermal liner, if desired, additional layers of nonwoven sheet comprising nanofibers can be incorporated into the thermal liner adjacent to or on either side of the thermal liner.

Test Methods

Vertical Flame Test. Vertical flame performance of the thermal liner was measured using ASTM D6413-99. Test procedure to determine char length is designed for material having lowest basis weight 2-6 oz/yd$^2$ (68-203 g/m$^2$); therefore, for the low basis weight material it was determined in multiple layers with combined basis weight of about 135 g/m².

Mean Flow Pore. The mean flow pore size of a nonwoven sheet is a quantity measured according to ASTM Designation E 1294-89, "Standard Test Method for Pore Size Characteristics of Membrane Filters Using Automated Liquid Porosimeter." A capillary Flow Porometer CFP-2100AE (Porous Materials Inc. Ithaca, N.Y.) was used. Individual samples of 25 mm diameter wetted with a low surface tension fluid (1,1,2,3,3,3-hexafluoropropene, or "Galwick," having a surface tension of 16 dyne/cm) and placed in a holder, and a differential pressure of air is applied and the fluid removed from the sample. The differential pressure at which wet flow is equal to one-half the dry flow (flow without wetting solvent) is used to calculate the mean flow pore size using supplied software.

Thickness. Thickness measurements of the individual materials was determined according to ASTM 5947 using 10 kPa (1.45 psi) pressure and 15 mm diameter foot (precision thickness gauge FT3 Hanatek Instruments, east Sussex, UK). Thickness measurements of the composite fabric were measured as per ASTM D1777-96 Option 1 using a standard pedestal mounted micrometer having 50.8 mm diameter foot and pressure 0.9 kPa (0.13 psi).

Thermal Performance. Thermal Protection Performance (TPP) was measured per NFPA 1971 (ISO 17492) at a heat flux of 2.0 cal/cm²s. Radiant Protection Perfomance (RPP) was measured per NFPA 1971 (ASTM F1939) at a heat flux of 0.5 cal/cm²s.

Basis Weight. The basis weight of the individual layers, including nonwoven sheets comprising nanofibers, was determined according to ASTM D-3776. The basis weight of the composite fabric was determined from the weight of the 6.75 inch×6.75 inch TPP test specimens.

Porosity. Porosity was calculated by dividing the basis weight of the sample in g/m² by the polymer density in g/cm3 and by the sample thickness in micrometers and multiplying by 100 and subsequently subtracting from 100%, i.e., percent porosity=100−basis weight/(density× thickness)×100.

Air Permeability. The Air Permeability was measured according to ASTM D737 at 125 Pa pressure difference.

Thermal Stability. Thermal stability of the thermally stable flame resistant fabric can be determined according to the method described in the National Fire Protection Association's 2007 edition of NFPA 1971.

Thermal Resistance/Thermal Conductivity. Thermal resistance (R) & thermal conductivity (k) of the sheets and fabrics were measured per ASTM E1530 (Guarded Heat Flow) using TA DTC 300 tester. Test area was 20.3 cm² (50.8 mm diameter). All samples were tested without heat compound grease to account for surface contact. Samples were tested under minimal pressure of 12 kPa and temperature setting to 100° C. with a cold plate being 10 degrees lower. Various resistance ranges were used to accommodate a range of samples: low range: 0.0005-0.010 m2K/W; mid-range: 0.0005-0.010 m2K/W, high range 0.01-0.05 m2K/W. Resistance was an output and the thermal conductivity was calculated using known sample thickness under similar pressure.

Example 1

A sample of a composite garment fabric having, in order, outer shell fabric, moisture barrier, thermal liner, and fabric lining was made from the following materials. The outer shell fabric, moisture barrier, and lining were all commercially available fabrics; the outer shell fabric being a 7.5 oz/yd² Kevlar®/PBI (60%/40%) fabric, the moisture barrier being a 6 oz/yd² Stedair® 3000 fabric, and the lining being a 3.3 oz/yd² Nomex® pajamacheck woven fabric.

A number of different thermal liners were made to construct a number of different composite garment fabrics for testing. Each thermal liner was made by combining a layer of a thermally stable flame resistant fabric, which in this instance was 1.5 oz/yd² (51 g/m²) style 715 Nomex® E89™ spunlaced aramid fiber nonwoven, with a layer of a nonwoven sheet comprising nanofibers. All of these thermal liners are capable of passing the vertical flame test of ASTM D6413-99.

The various nonwoven sheets comprising nanofibers were produced using the electroblowing method described in detail in U.S. Published Patent Application 2005/0067732 using polymers having an LOI in excess of 26. The properties of the various nonwoven sheets comprising nanofibers that were used are shown in Table 1. The nonwoven sheets comprising nanofibers had various amounts of surface texturing. Sample 1-2 had a highly textured surface while sample 1-1 had a medium textured surface. Both samples 1-4 and 1-B has a low textured surface, and sample 1-5 had a very low textured surface that was almost smooth. Sample 1-3 had a smooth, essentially flat surface.

TABLE 1

| Example | Polymer Type* | Basis Weight, g/m² | Thickness, micrometers | Porosity, % | Mean Flow Pore, micrometers |
|---------|---------------|-------|-----------|-------|-----|
| 1-1 | PI  | 18 | 121 | 90 | 3.6 |
| 1-2 | PI  | 8  | 46  | 88 | 4.8 |
| 1-3 | PI  | 24 | 59  | 72 | 1.8 |
| 1-4 | PES | 15 | 99  | 89 | 6.1 |
| 1-5 | PI  | 17 | 108 | 89 | 5.6 |
| 1-A | A   | 80 | 541 | 89 | 30  |
| 1-B | PES | 5  | 45  | 92 | 11  |

*PI = Polyimide, PES = Polyether Sulfone, A = meta-aramid & para-aramid blend.

The performance of samples of composite garment fabrics was measured by laying up individual fabric layers in the test holder to prototype a multilayer construction. The various layers were, in order, outer shell fabric, moisture barrier, thermal liner, and fabric lining, with the outer shell fabric nearest the thermal threat. The thermal liner was arranged with the nonwoven sheet comprising nanofibers side in contact with the moisture barrier and the thermally stable flame resistant fabric side in contact with the lining. A control sample having an outer shell fabric, moisture barrier, thermal liner, and fabric lining, wherein the thermal liner was just a layer of 1.5 oz/yd² (51 g/m²) style 715 Nomex® E89™ spunlaced aramid fiber nonwoven, which has a porosity of 90%, was also made without using any additional nonwoven nanofiber sheet or other sheets or fabrics.

Two samples of comparison composite garment fabrics were also laid up in a similar manner. The first comparison sample was made from an outer shell fabric, moisture barrier, thermal liner, and fabric lining, wherein the thermal liner consisted of two layers of thermally stable flame resistant fabric, one layer of which was 1.5 oz/yd² (51 g/m²) style 715 Nomex® E89™ spunlaced aramid fiber nonwoven, and the other layer being a 2.3 oz/yd² (80.4 g/m²) version of the same spunlaced aramid fiber nonwoven. The properties of a single layer of this 2.3 oz/yd² (80.4 g/m²) spunlaced aramid fiber nonwoven (1-A) are shown in Table 1. The second comparison sample was made from an outer shell fabric, moisture barrier, thermal liner, and fabric lining, wherein the thermal liner was a nonwoven sheet comprising nanofibers, designated 1-B, combined with one layer of the 1.5 oz/yd² (51 g/m²) style 715 Nomex® E89™ spunlaced aramid fiber nonwoven. The properties of a single layer of nonwoven sheet comprising nanofibers (1-B) is also shown in Table 1.

The samples of composite garment fabric were then tested for Thermal Protection Performance (TPP) per NFPA 1971/ISO 17492 (at 2.0 cal/cm²*s) and radiant protection performance (RPP) per ASTM F1939 (@ 0.5 cal/cm²*s) heat performance. The properties of the composite garments and thermal performance, made with the various thermal liners are shown in Table 2.

A comparison of any of the composite garment fabric samples 1-1 through 1-4 with the Control illustrates that the addition of the nonwoven sheet comprising nanofibers increases TPP (direct flame insulation) by at least about 5% while adding much less than 5% by weight, while also increasing the RPP (radiant heat insulation) by greater than 5% (in most cases significantly greater than 5%) while adding much less than 5% by weight.

TABLE 2

| Example | Composite Avg Basis Weight, g/m² (oz/yd²) | Percent Weight Increase | Composite Average Thickness, mm (mils) | TPP @ 2 cal/cm² | Percent TPP Increase | RPP @ 0.5 cal/cm² | Percent RPP Increase |
|---|---|---|---|---|---|---|---|
| Control | 622 (18.3) | — | 1.7 (66) | 30.5 | — | 25.3 | — |
| 1-1 | 639 (18.8) | 2.7 | 1.8 (71) | 32.2 | 5.6 | 28.1 | 11.1 |
| 1-2 | 629 (18.5) | 1.3 | 1.7 (67) | 32.2 | 5.6 | 26.7 | 5.5 |
| 1-3 | 646 (19.0) | 3.9 | 1.8 (69) | 32.3 | 5.9 | 29.2 | 15.4 |
| 1-4 | 639 (18.8) | 2.7 | 1.8 (71) | 32.1 | 5.2 | 27.7 | 9.5 |
| 1-5 | 638 (18.8) | 2.7 | 1.8 (71) | 32.3 | 5.9 | 27.0 | 6.7 |
| 1-A | 700 (20.6) | 12.6 | 2.3 (90) | 36.0 | 18 | 28.1 | 11.1 |
| 1-B | 625 (18.4) | 0.8 | 1.7 (67) | 30.8 | 1.0 | 25.5 | 0.8 |

As shown in Table 2, the composite fabric samples utilizing thin sample items 1-1 through 1-4 had improved TPP performance versus the control. Further, the RPP performance of the composite fabric samples was also increased, with some of these composite fabric samples with equivalent or improved performance versus a thick standard thermal liner made using staple fibers, as illustrated by sample item 1-A. However, as shown in Table 1, all the nanofiber and comparison sheets have high porosity, all being within a range of 72-92%, and all had similar weights.

To further understand the synergy between the properties of the nonwoven sheet comprising nanofibers and the thermally stable flame resistant fabric (which in this case was a spunlaced nonwoven) in the thermal liner, other properties of the nonwoven nanofiber sheets and its synergy with the thermally stable flame resistant fabric are shown in Table 3. In the table, $T_1$ and $R_1$, refer to the average thickness and thermal resistance of the thermally stable flame resistant fabric, which in this case was one layer of 1.5 oz/yd² (51 g/m²) style 715 Nomex® E-89™ spunlaced aramid fiber nonwoven. $T_2$ and $R_2$ refer to the average thickness and thermal resistance of the individual nonwoven sheets comprising nanofibers, measured on one sheet.

The table also provides a new structural parameter that describes the structure porosity and pore of materials having different average thickness, which is "air permeability× average thickness". The units are (cfm)×(micrometer) or in international units (m3/m2/min)×(micometers).

TABLE 3

| Example | Thermal Resistance "$R_2$", $m^2K/W$ ($\times 10^{-3}$) | Thermal Conductivity "$K_2$", $W/mK$ ($\times 10^{-2}$) | Change in Resistance, $(R_1 + R_2)/R_1$ | $T_1/T_2$ | Air Permeability, cfm ($m^3/m^2/min$) | Thickness Air Permeability, cfm * micrometer ($m^3/m^2/min$ * micrometer) |
|---|---|---|---|---|---|---|
| Control | 6.92 | 5.4 | — | — | 360 (173) | 18300 (8800) |
| 1-1 | 2.8 | 4.3 | 1.5 | 0.323 | 11 (5) | 1306 (864) |
| 1-2 | 1.6 | 2.9 | 1.3 | 0.123 | 28 (13) | 1304 (626) |
| 1-3 | 1.5 | 3.9 | 1.2 | 0.160 | 3.0 (1.4) | 181 (87) |
| 1-4 | 2.8 | 3.5 | 1.4 | 0.264 | 23 (11) | 2286 (1096) |
| 1-5 | 2.6 | 4.1 | 1.3 | 0.290 | 25 (12) | 2688 (1290) |
| 1-A | 9.35 | 5.8 | 2.2 | 1.44 | 260 (125) | 20900 (10000) |
| 1-B | 0.9 | 3.2 | 1.10 | 0.120 | 217 (104) | 9657 (4635) |

As shown in Table 3 by both the control sample (which again is the thermally stable flame resistant fabric, which is one layer of 1.5 oz/yd² (51 g/m²) style 715 Nomex® E89™ spunlaced aramid fiber nonwoven) and comparison example 1-A (which again is the addition of a 2.3 oz/yd² (80.4 g/m²) version of the same spunlaced aramid fiber nonwoven fabric with the control), these traditional staple fiber nonwovens tend to have a higher thermal conductivity than the nanofiber webs, and the increased thickness of these fabrics also tends to increase their thermal resistance. However, as evidenced by the last two columns in Table 3, it is believed that the thickness air permeability of the nanofiber sheet is an important parameter when a nanofiber sheet is combined with another thermally insulating sheet. For example, if the nanofiber sheet is too thin and too air permeable, as is the case of sample item 1-B, little increase in TPP and RPP results, as shown in Table 2.

Example 2

The composite garment fabric samples using either nonwoven sheets comprising nanofibers 1-1 or 1-3, which were laid up and tested in Example 1, were additionally quilted with Nomex® aramid thread (available from Atlantic Thread and Supply, Baltimore, Md.) to form two quilted composite garment fabrics. The samples of composite garment fabric were then tested for thermal (TPP) and radiant (RPP) heat performance as in Example 1. The thermal properties of the quilted composite garment fabrics were the same as the samples that were simply laid up as in Example 1. These quilted composite garment fabric samples were then exposed to 5 wash cycles and the thermal and radiant performance measured again. The properties of these samples are shown in Table 4. Surprisingly, the thermal and radiant performance of the quilted composite fabrics increased with washing.

TABLE 4

| Example | TPP @ 2 cal/cm² | Percent TPP Increase (Over Control) | RPP @ 0.5 cal/cm² | Percent RPP Increase (Over control) |
|---|---|---|---|---|
| 1-1 Quilted | 32 | 5.6 | 28 | 11.1 |
| 1-1 Quilted & Washed | 33 | 8.8 | 29 | 14.3 |
| 1-3 Quilted | 32 | 5.9 | 29 | 15.4 |
| 1-3 Quilted & Washed | 33 | 9.1 | 30 | 18.0 |

Example 3

Composite garment fabric samples were made using either nonwoven sheets comprising nanofibers 1-1 or 1-3, and were laid up and tested with the same outer shell fabric, moisture barrier fabric and lining fabric as in Example 1; however, in this instance the thermal liner included the 2 layers of the 1.5 oz/yd² (51 g/m²) style 715 Nomex® E89™ spunlaced aramid fiber nonwoven along with a single a layer of either the 1-1 or 1-3 nonwoven sheets comprising nanofibers. The control sample consisted of the same composite garment fabric sample, but the thermal liner was only 2 layers of the 1.5 oz/yd² (51 g/m²) style 715 Nomex® E89™ spunlaced aramid fiber nonwoven without any additional nonwoven nanofiber sheet. The properties of these samples are shown in Table 5. Again, the addition of the nonwoven sheets comprising nanofibers significantly increased the TPP and RPP performance (greater than 6% and greater than 10 percent, respectively) with very little increase (less than 3 wt %) in the fabric weight.

TABLE 5

| Example | Composite Avg Basis Weight, g/m² (oz/yd²) | Percent Weight Increase | Composite Average Thickness, micrometers (mils) | TPP @ 2 cal/cm² | Percent TPP Increase | RPP @ 0.5 cal/cm² | Percent RPP Increase |
|---|---|---|---|---|---|---|---|
| Control | 673 (19.8) | — | 2.2 (85) | 34 | — | 28 | — |
| 1-1 | 683 (20.1) | 1.5 | 2.3 (89) | 37 | 8.8 | 31 | 10.8 |
| 1-3 | 690 (20.3) | 2.5 | 2.2 (87) | 36 | 6.8 | 31 | 11.5 |

Example 4

Example 3 was repeated, however, the composite garment fabric samples only contained an outer shell fabric, the thermal liner, and a lining fabric. Specifically, the outer shell fabric was a 4.6 oz/yd² Nomex® IIIA fabric and the lining fabric was a 2.7 oz/yd² Nomex® knit fabric.

The control sample consisted of composite garment fabric wherein the thermal liner was 1 layer of the 1.5 oz/yd² (51 g/m²) style 715 Nomex® E89™ spunlaced aramid fiber nonwoven, without any additional nonwoven nanofiber sheet. Then two additional composite garment fabric samples were made where the thermal liner included the single spunlaced layer along with a single a layer of either the 1-1 or 1-3 nonwoven sheets comprising nanofibers. The properties of these samples are shown in Table 6. Again, the addition of the nonwoven sheets comprising nanofibers significantly increased the TPP and RPP performance (greater than 6% and greater than 10 percent, respectively) with very little increase (less than 3 wt %) in the fabric weight.

TABLE 6

| Example | Composite Avg Basis Weight, g/m² (oz/yd²) | Percent Weight Increase | Composite Average Thickness, mm (mils) | TPP @ 2 cal/cm² | Percent TPP Increase | RPP @ 0.5 cal/cm² | Percent RPP Increase |
|---|---|---|---|---|---|---|---|
| Control | 309 (9.1) | — | 1.4 (56) | 15 | — | 15 | — |
| 1-1 | 337 (9.9) | 8.8 | 1.6 (62) | 18 | 19.3 | 19 | 25.8 |
| 1-3 | 316 (9.3) | 2.7 | 1.5 (60) | 16 | 7.5 | 17 | 14.1 |

What is claimed is:

1. A flame resistant thermal liner comprising
   (a) a nonwoven sheet comprising nanofibers of a synthetic polymer having an limiting oxygen index of at least 21, a mean flow pore of 10 micrometers or less, a thickness air permeability of 25 to 6000 cubic feet per min–micrometers (12 to 2880 cubic meters per square meter per min–micrometers), and an average thickness $T_1$; and
   (b) a thermally stable flame resistant fabric attached to an outer surface of the nonwoven sheet, the fabric having an average thickness $T_2$; a surface of the thermally stable fabric being in contact with a surface of the nonwoven sheet;
   wherein $T_1$ and $T_2$ are selected such that the ratio of $T_1$ to $T_2$ is less than 0.75.

2. The thermal liner of claim 1, wherein $T_1$ and $T_2$ are selected such that the ratio of $T_1$ to $T_2$ is less than 0.30.

3. The thermal liner of claim 1, wherein $T_1$ and $T_2$ are selected such that the ratio of $T_1$ to $T_2$ is greater than 0.120.

4. The thermal liner of claim 3 wherein, when the thermal liner is exposed to flame in accordance with ASTM D6413-99, the afterflame is no greater than 2 seconds.

5. The thermal liner of claim 4 wherein the nonwoven sheet comprising nanofibers comprises nanofibers made from polyimide, meta-aramid, para-aramid, polybenzazole, polybenzimidazole, or mixtures thereof; and the thermally stable flame resistant fabric comprises staple fiber and/or continuous filaments made from polyimide, meta-aramid, para-aramid, polybenzazole, polybenzimidazole, or mixtures thereof.

6. A flame resistant composite fabric system comprising an outer shell fabric and flame resistant thermal liner, the thermal liner comprising:
   (a) a nonwoven sheet comprising nanofibers of a synthetic polymer having an limiting oxygen index of at least 21, a mean flow pore of 10 micrometers or less, a thickness air permeability of 25 to 6000 cubic feet per min–micrometers (12 to 2880 cubic meters per square meter per min–micrometers), and an average thickness $T_1$; and
   (b) a thermally stable flame resistant fabric attached to an outer surface of the nonwoven sheet, the fabric having an average thickness $T_2$; a surface of the thermally stable fabric being in contact with a surface of the nonwoven sheet;
   wherein $T_1$ and $T_2$ are selected such that the ratio of $T_1$ to $T_2$ is less than 0.75.

7. The flame resistant composite fabric system of claim 6, wherein $T_1$ and $T_2$ are selected such that the ratio of $T_1$ to $T_2$ is less than 0.30.

8. The flame resistant composite fabric system of claim 6, wherein $T_1$ and $T_2$ are selected such that the ratio of $T_1$ to $T_2$ is greater than 0.120.

9. A flame resistant protective garment comprising the composite fabric system of claim 8.

10. The flame resistant composite fabric system of claim 6 further comprising a moisture barrier positioned between the outer shell fabric and the thermal liner.

11. The flame resistant composite fabric system of claim 10, wherein the nonwoven sheet comprising nanofibers comprises nanofibers made from polyimide, meta-aramid, para-aramid, polybenzazole, polybenzimidazole, or mixtures thereof; and the thermally stable flame resistant fabric comprises staple fiber and/or continuous filaments made from polyimide, meta-aramid, para-aramid, polybenzazole, polybenzimidazole, or mixtures thereof.

12. The flame resistant composite fabric system of claim 10, wherein $T_1$ and $T_2$ are selected such that the ratio of $T_1$ to $T_2$ is less than 0.30.

13. The flame resistant composite fabric system of claim 10, wherein $T_1$ and $T_2$ are selected such that the ratio of $T_1$ to $T_2$ is greater than 0.120.

14. A flame resistant protective garment comprising the composite fabric system of claim 13.

* * * * *